United States Patent
Caufield et al.

(10) Patent No.: US 9,298,596 B2
(45) Date of Patent: Mar. 29, 2016

(54) TEST FRAMEWORK FOR COMPUTING JOBS

(71) Applicant: International Business Machines Corporation, Armonk, NY (US)

(72) Inventors: Brian K. Caufield, Livermore, CA (US); Ajay Sood, Bangalore (IN); Julian J. Vizor, Milton Keynes (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/937,602

(22) Filed: Jul. 9, 2013

(65) Prior Publication Data

US 2015/0020049 A1     Jan. 15, 2015

(51) Int. Cl.
*G06F 17/40* (2006.01)
*G06F 11/36* (2006.01)

(52) U.S. Cl.
CPC ........ *G06F 11/3684* (2013.01); *G06F 11/3664* (2013.01); *G06F 11/3692* (2013.01)

(58) Field of Classification Search
CPC ............... G06F 7/78; G06F 8/00–8/78; G06F 9/44–9/455; G06F 11/36
USPC ................................. 717/100–178
See application file for complete search history.

(56) References Cited

U.S. PATENT DOCUMENTS

| | | | |
|---|---|---|---|
| 5,615,335 A | 3/1997 | Onffroy et al. | |
| 8,024,369 B2 | 9/2011 | Pellegrini et al. | |
| 8,185,877 B1 * | 5/2012 | Colcord | G06F 9/44 717/124 |
| 2001/0034880 A1 * | 10/2001 | Dzoba et al. | 717/4 |
| 2005/0188271 A1 * | 8/2005 | West et al. | 714/38 |
| 2007/0250819 A1 * | 10/2007 | Fjeldstad et al. | 717/129 |
| 2008/0235633 A1 * | 9/2008 | Ghiloni et al. | 715/862 |
| 2009/0106256 A1 * | 4/2009 | Safari | G06F 11/1433 |

(Continued)

OTHER PUBLICATIONS

Jorg, Towards Generating ETL Processes for Incremental Loading, 2008.*

(Continued)

*Primary Examiner* — Wei Zhen
*Assistant Examiner* — Zhan Chen
(74) *Attorney, Agent, or Firm* — Susan Murray; Edell, Shapiro & Finnan, LLC

(57) ABSTRACT

According to one embodiment of the present invention, a system tests jobs in a computing environment. The system creates a test case for one or more existing executable jobs without modifying the job design or recompiling the executable itself, wherein the test case includes one or more capture points in a job flow of the executable jobs and corresponding rules for capturing data, identification of data for testing the one or more executable jobs, and rules for comparing the captured data to expected results. The system captures the data at the one or more capture points in the job flow in accordance with the test case and generates a baseline of expected results. The system executes the test case to test the one or more executable jobs by capturing data at the one or more capture points generated from execution of the one or more executable jobs and compares result data from the one or more capture points to the baseline of expected results in accordance with the comparison rules to determine a result of the test. Embodiments of the present invention further include a method and computer program product for testing jobs in a computing environment in substantially the same manners described above.

20 Claims, 5 Drawing Sheets

(56) References Cited

U.S. PATENT DOCUMENTS

| | | | |
|---|---|---|---|
| 2009/0113399 A1* | 4/2009 | Tzoref et al. | 717/130 |
| 2009/0307763 A1 | 12/2009 | Rawlins et al. | |
| 2011/0083121 A1 | 4/2011 | Dixit et al. | |
| 2011/0123973 A1 | 5/2011 | Singh | |
| 2011/0307866 A1* | 12/2011 | Demiroski et al. | 717/124 |
| 2012/0173479 A1* | 7/2012 | Nelke | G06F 17/30592 707/602 |
| 2012/0278587 A1 | 11/2012 | Caufield et al. | |
| 2012/0290527 A1 | 11/2012 | Yalamanchilli | |

OTHER PUBLICATIONS

Thomsen et al., "ETLDiff: A Semi-automatic Framework for Regression Test of ETL Software"; A Min Tjoa and J. Trujillo (Eds.): Data Warehousing and Knowledge Discovery, DaWaK 2006, LNCS 4081; Springer-Verlag, Berlin Heidelberg 2006, Germany, 15 pages.

YouTube, "MagenTys ETL Automated Testing Framework Demo", http://www.youtube.com/watch?v=g0XKi2P2_d4, Apr. 11, 2012, 3 pages.

Patent Application GB920120096GB1, "Integrating Data Transform Test With Data Transform Tool", 33 pages.

* cited by examiner

TEST FRAMEWORK FOR COMPUTING JOBS

BACKGROUND

1. Technical Field

Present invention embodiments relate to testing jobs in a computing environment, and, more specifically, to a framework for developing, deploying, and executing tests of Extract, Transform, and Load jobs.

2. Discussion of the Related Art

Many organizations use Extract, Transform, and Load (ETL) jobs with a large number of stages to integrate information on a regular basis. These jobs are generally designed using a graphical interface, sometimes referred to as a canvas. The designer of an ETL job drags and drops stages on the canvas and creates connections (sometimes referred to as links) between the stages. The stages and connections between them are treated as interconnected nodes in a graph. Code is generated for the job based on the graph. A number of optimization steps are performed on the generated code to produce a final executable that is ultimately deployed and used.

At various times after a job has been produced, a user may want to test the job to determine whether errors have arisen. This is referred to as regression testing. For example, a user might perform regression testing after (1) moving a job from the development phase to a quality assurance phase or from quality assurance to production; (2) changing the ETL system, e.g. applying a software fix; (3) migrating a job from one system to another, e.g. to new hardware; or (4) migrating a job from one version of an ETL product to the next version of the product. Typical ETL test and production environments place restrictions on applying changes to existing compiled/executable jobs, which requires that testing related considerations must either be built into the job during development or performed manually against the executable on an ad hoc basis.

BRIEF SUMMARY

According to one embodiment of the present invention, a system tests jobs in a computing environment. The system creates a test case for one or more existing executable jobs without modifying the job design or recompiling the executable itself, wherein the test case includes one or more capture points in a job flow of the executable jobs and corresponding rules for capturing data, identification of data for testing the one or more executable jobs, and rules for comparing the captured data to expected results. The system captures the data at the one or more capture points in the job flow in accordance with the test case and generates a baseline of expected results. The system executes the test case to test the one or more executable jobs by capturing data at the one or more capture points generated from execution of the one or more executable jobs and compares result data from the one or more capture points to the baseline of expected results in accordance with the comparison rules to determine a result of the test. Embodiments of the present invention further include a method and computer program product for testing jobs in a computing environment in substantially the same manners described above.

BRIEF DESCRIPTION OF THE SEVERAL VIEWS OF THE DRAWINGS

Generally, like reference numerals in the various figures designate like components.

DETAILED DESCRIPTION

Present invention embodiments relate to testing jobs in a computing environment. For example, an embodiment of the invention provides a framework for developing, deploying, and executing tests (e.g., regression tests) of an Extract, Transform, and Load (ETL) job. A user specifies a sample of input test data, rules for capturing data and metadata at points of the data flow of the job, and rules for comparing the captured data to baseline values. Initially, the job is run with the sample of input test data as input, and the resulting captured data and metadata form the baseline. The rules, test data, and baseline (or references thereto) are stored as part of the job package so that the test case moves with the job from one environment to another. When the user wishes to verify the job, the test case is again run with the test data as input; data and metadata are captured at the specified points; and the captured information is compared to the baseline. The framework may operate with a graphical-based ETL job development system.

One aspect of a present invention embodiment is to save time spent testing over the lifecycle of the job. Once tests are defined for a job, they can be repeated at various times (e.g., when the job is moved from the development phase to the quality assurance phase, from quality assurance to production, from one version to another, etc.). Another aspect of a present invention embodiment is to perform tests of jobs with a large number of stages and be able to pinpoint the stage at which a problem occurs. Once a failure has been reported, information captured at intermediate points of the job helps determine where data changed from what was expected. Yet another aspect of a present invention embodiment is to define and run tests without recompiling the job or modifying its behavior with respect to the data (e.g., by adding or changing parameters, introducing new steps for the purpose of debugging, etc.). Since the job is unchanged, this allows for tests to be defined at any time, in particular retrospectively in test and production environments or during migrations where changes to jobs are not allowed. A still further aspect of a present invention embodiment is to provide repeatable tests that can be run without the need for the test creator or other domain expert to determine success or failure.

Figure 1:
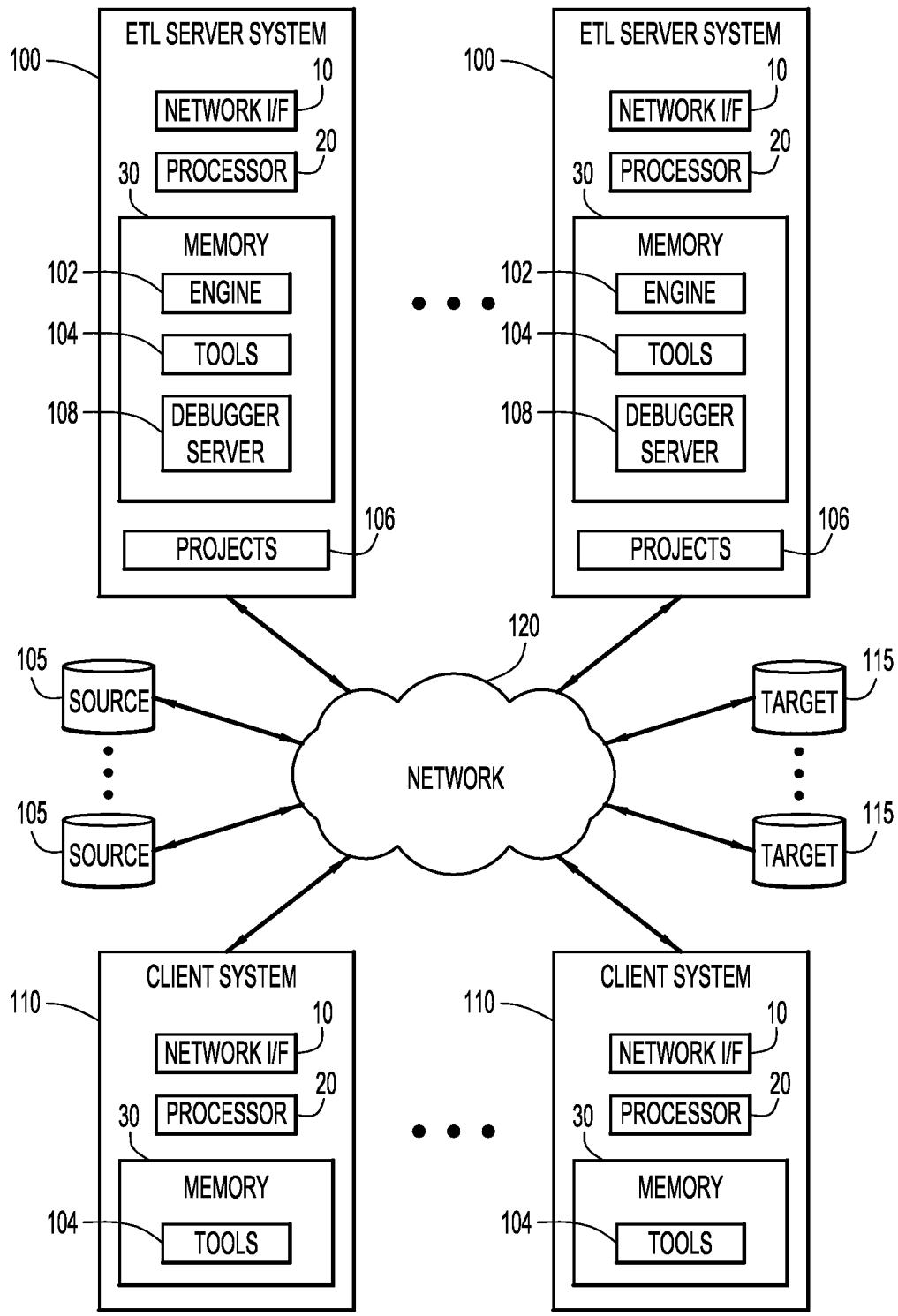
FIG. 1 is a diagrammatic illustration of a computing environment for an embodiment of the present invention.

An example computing environment for a present invention embodiment is illustrated in FIG. 1. Specifically, the environment includes one or more server systems 100 (e.g., development systems, quality assurance systems, production systems, etc.), client or end-user systems 110, data sources 105, and target systems 115, which may be remote from each other and communicate over a network 120. Data sources 105 and target systems 115 may include a variety of data systems (e.g., computer systems, databases, applications, flat files, etc.) from a variety of locations.

Network 120 may be implemented by any number of any suitable communications media (e.g., wide area network (WAN), local area network (LAN), Internet, intranet, etc.).

Alternatively, any number of data sources 105, target systems 115, ETL server systems 100, and client systems 110 may be local to each other, and communicate via any appropriate local communication medium (e.g., local area network (LAN), hardwire, wireless link, intranet, etc.).

ETL server system 100 includes engine 102, tools module 104, one or more projects 106, and may include debugger server 108. The engine, tools module, projects, and debugger server may be implemented across plural computing systems. For example, the ETL server system may include one or more compute nodes dedicated to performing operations of an ETL process. Alternatively, the engine, tools module, debugger server, and/or projects may reside on a client system 110 or other computer system in communication with the client system. An ETL server system executes one or more jobs of a project via engine 102 to receive data from one or more data sources, perform operations of the job, and send data to one or more targets.

Client systems 110 enable users to communicate with an ETL server system (e.g., via network 120). The client systems may present any graphical user (e.g., GUI, etc.) or other interface (e.g., command line prompts, menu screens, etc.) to receive commands from users and interact with an ETL server system and/or other systems, modules, or services.

Server systems 100 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., network software, database software, ETL software, debugger software, etc.).

Engine 102 and tools module 104 may include one or more modules or units to perform the various functions of present invention embodiments described below (e.g., defining test cases, capturing data, comparing results of test runs, etc.), may further include conventional or other modules or units for designing, scheduling, executing, monitoring, and debugging jobs, may be implemented by any combination of any quantity of software and/or hardware modules or units, and may reside within memory 30 of server system 100 for execution by processor 20. Alternatively, tools module 104 or units thereof may reside within memory of a client system for execution by a processor of the client system.

Figure 2:
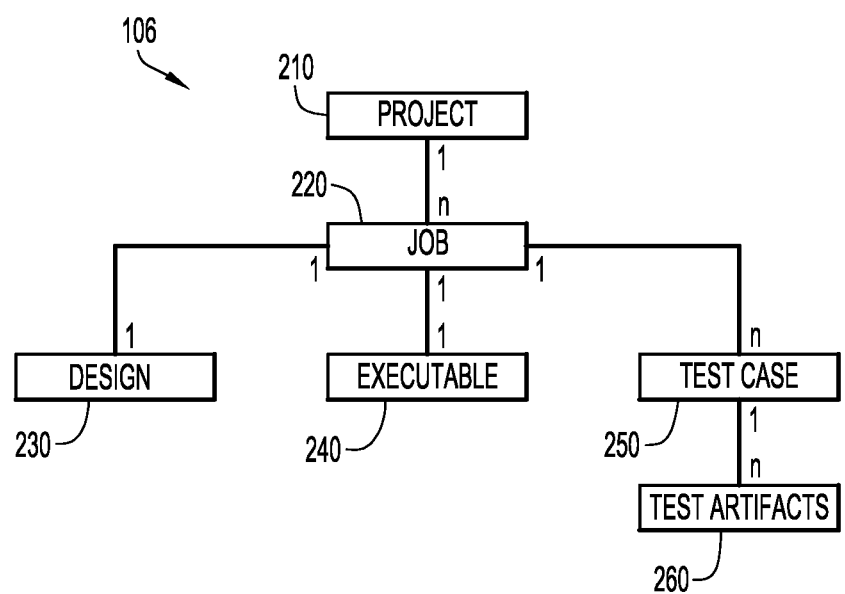
FIG. 2 is depicts a block diagram of an Extract, Transform, and Load (ETL) project including test cases according to an embodiment of the present invention.

A block diagram of a project 106 (see FIG. 1) according to an embodiment of the present invention is illustrated in FIG. 2. Project 106 includes one or more jobs 220, where a specification of a test case for a job is stored as an element of the job metadata (e.g., the specification of the job design, including operations to be performed, links between operations, runtime parameters, etc.). In particular, each job includes a design 230, an executable 240, and any number of test cases 250, each comprising one or more test artifacts 260. Tools module 104 may provide a GUI with which a user may create and compile the design to produce the executable. Test case 250 is a specification of a particular test for a given job. Artifacts 260 can include a name of the test case, rules specifying when, where, and which data objects in the job flow are to be captured, rules for comparing captured data to a baseline reference, the source data (or location of the source data) to be used as input each time the test is run, baseline data and metadata captured in a reference run, and configuration files.

Storing the test case with the job metadata facilitates management, movement, and synchronization of the job and its test cases. Features can be implemented in tools module 104 to automatically associate test cases with a specific job, or a specific version of a job; determine whether test cases have been created for a job, and how many; determine whether a job's test cases pass or fail; determine when test cases have become out of date and may require updating; remove test cases for jobs that no longer exist; move test cases to new systems without losing their relationships to the associated jobs; etc.

Figure 3:
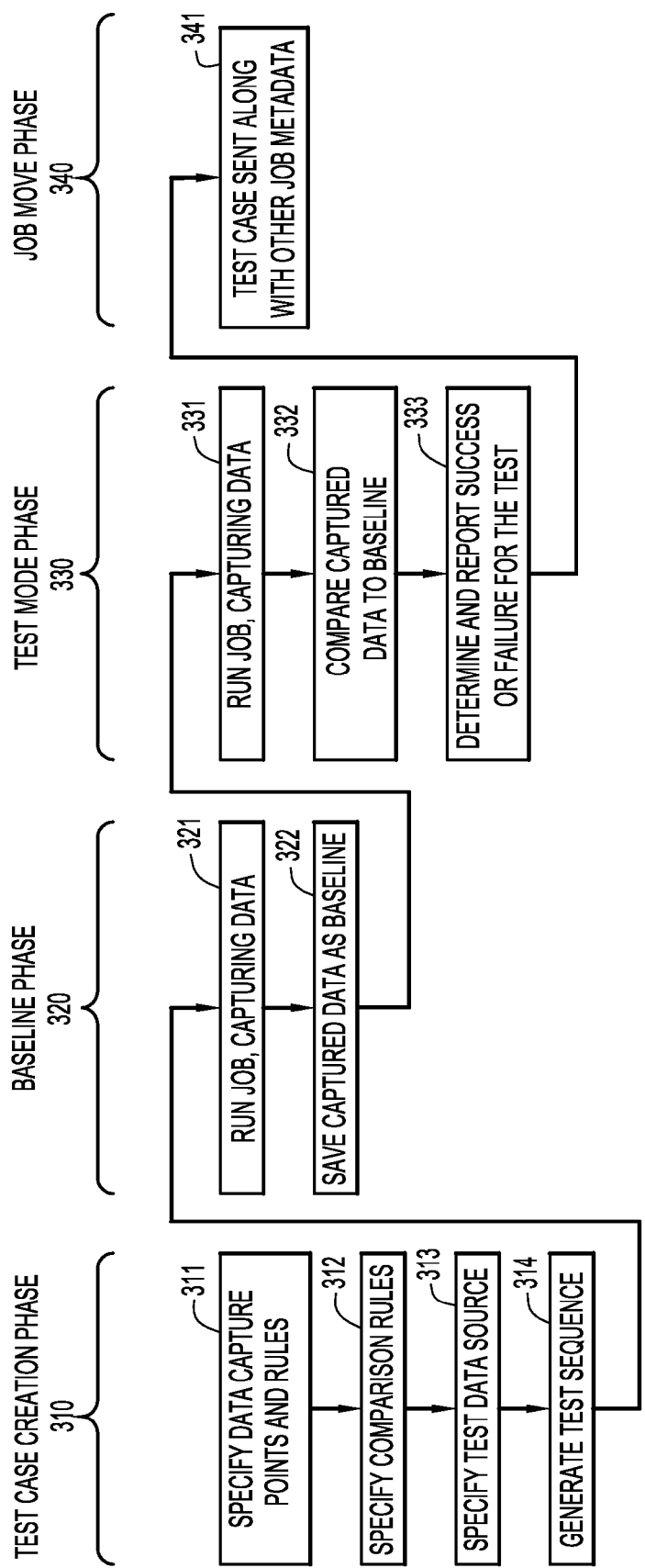
FIG. 3 depicts a flow diagram of a job test lifecycle according to an embodiment of the present invention.

Example phases in the job testing lifecycle according to an embodiment of the present invention are illustrated in the flow diagram of FIG. 3. The job testing lifecycle can include test case creation phase 310, a baseline phase 320, a test mode phase 330, and a phase 340 in which the job is moved to a new system or environment. The sequence of phases depicted in FIG. 3 illustrates a testing lifecycle by way of example and is not meant to be limiting. For example, a job might go through several cycles of testing/fixing/testing/fixing. Also, a job might move through several environments on its way to production, e.g., environments for quality assurance, system testing, performance testing, production, etc.

In the test case creation phase, a user creates a test case, e.g., via a test case editor of tools module 104 and client system 110 and/or server system 100. A test case editor may present the user with a GUI similar to one for designing a job (e.g., both may include interactive canvases displaying a graphical representation of the job); however, creating a test case 250 (FIG. 2) does not alter the job design 230 or compiled/executable code 240.

The user specifies points in the data flow of the job at which data should be captured (e.g., by clicking on a link in a diagram of the job flow) and rules for capturing the data (e.g., by entering/selecting/editing rules for a selected capture point) at step 311. For example, the user may specify data on links between particular stages be captured at certain times or upon certain conditions (e.g., the first hundred rows that flow over the link, the first ten of each one hundred rows, each row for which a specified column has specified values, etc.). The user may also specify information about the data flow (referred to as operational metadata; e.g., the number of rows flowing over a link) to be captured. The user specifies rules for comparing the captured data to baseline values at step 312. Comparison rules may provide, e.g., which columns to compare, a tolerance within which captured data should match the baseline, fields to ignore in a comparison (e.g., timestamps of records created at run time), etc. The user specifies the input data source to be used each time the test is run at step 313. At step 314, a test sequence is generated (e.g., automatically via the tools module 104).

Figure 4:
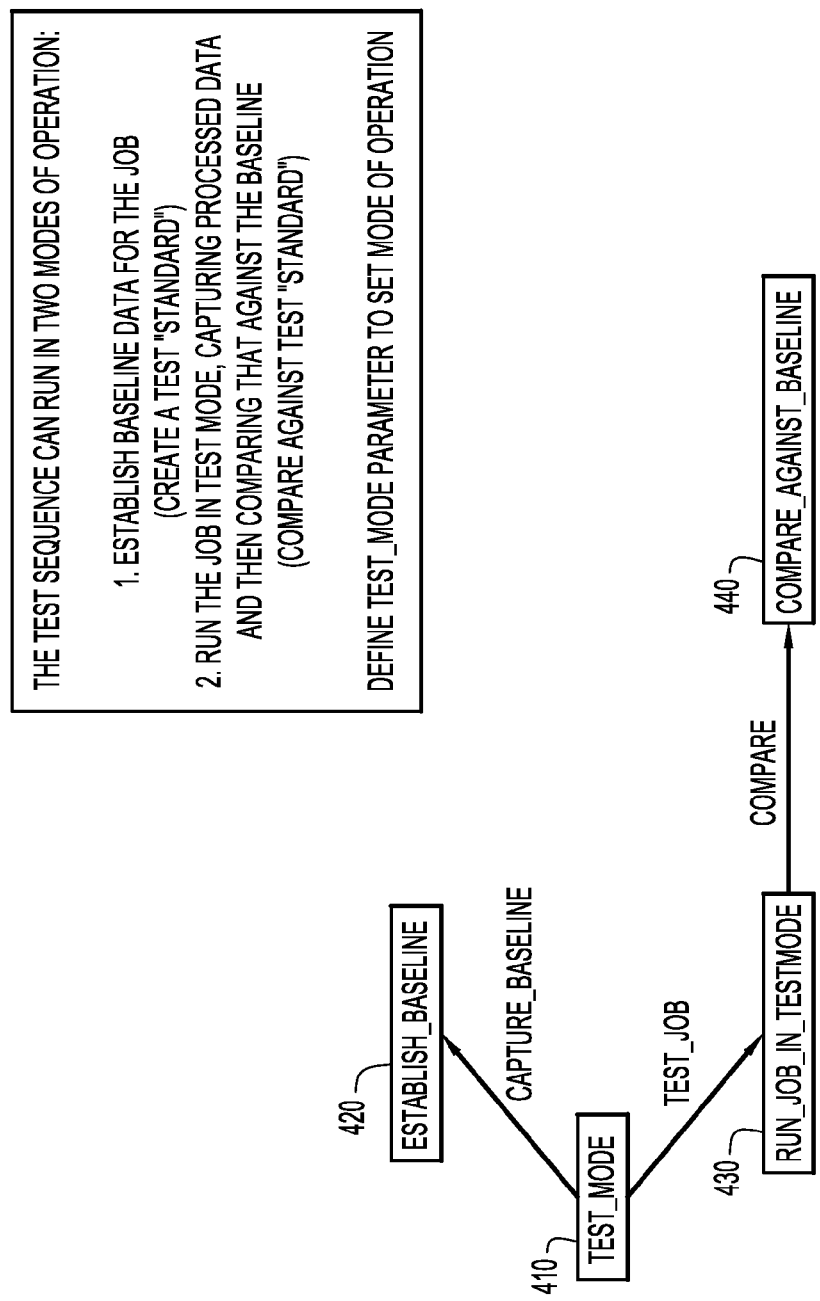
FIG. 4 depicts modes of a test sequence according to an embodiment of the present invention.

The test sequence comprises instructions to run the job, with the test data as the source, while capturing the specified data in the flow, and further instructions to handle the captured data. As illustrated in FIG. 4, the test sequence can run in a mode 420 to capture a baseline and a mode 430 to test a job by capturing data and performing a comparison 440 of the captured data to the baseline. The mode can be controlled by a mode parameter 410.

In baseline phase 320, the job is run (e.g., by engine 102 and server system 100) in mode 420 to capture the specified data in the job flow at step 321. The captured data is regarded as the expected result (the baseline) against which future test runs are to be compared. The benchmark results are stored with the job metadata as an artifact of the test case at step 322.

In test mode phase 330, the job is run (e.g., by engine 102 and server system 100) in baseline capture mode 430. The specified data is captured at step 331. The captured data is compared to the baseline data at step 332. Based on the comparison and on rules specified in the test case definition, the system determines whether test was a success or failure at step 333. The system can provide information about the location of the first detected difference.

In job move phase 340, the job is moved to a new system (e.g., from a development system to a test system or from a test system to a production system). The test case definition and artifacts are exported with the other metadata of the job at step 341. Once the metadata is imported in the new system, the test cases can be run.

Figure 5:
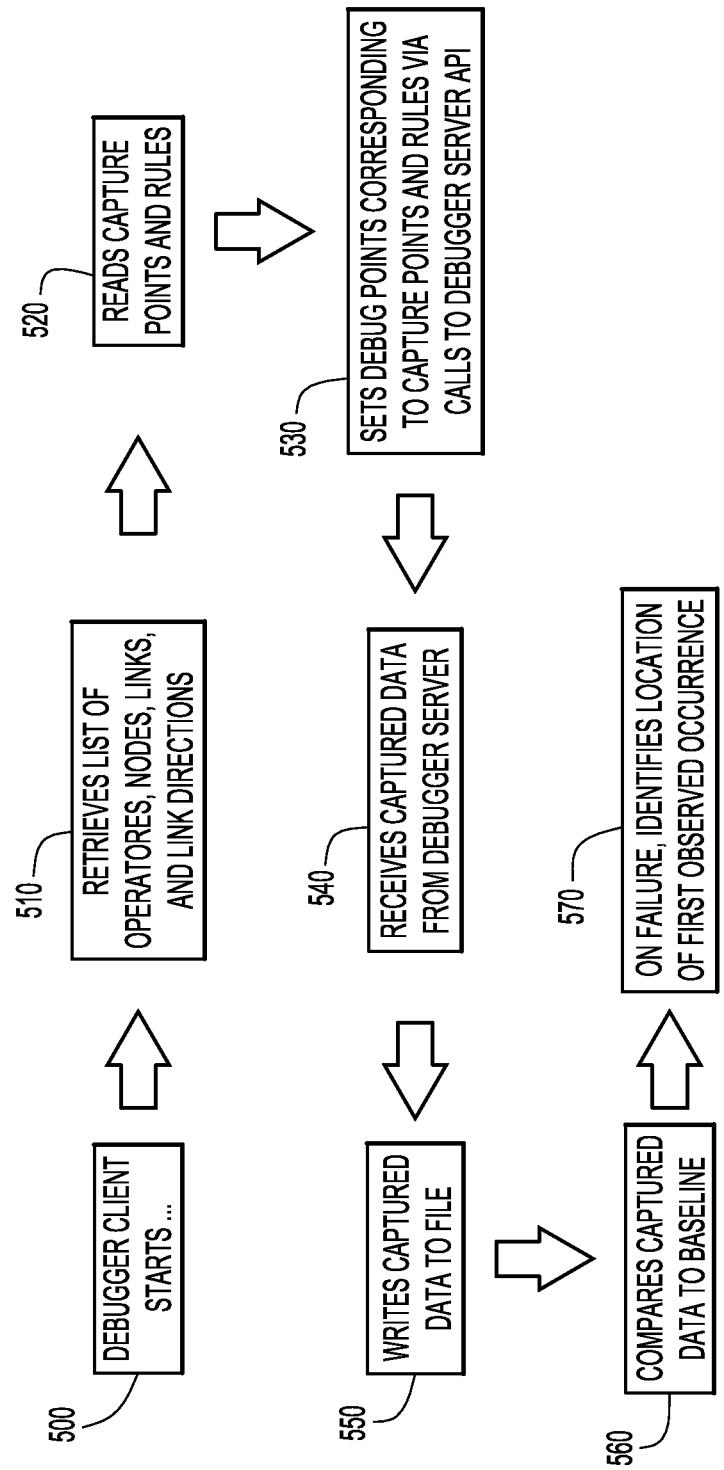
FIG. 5 depicts a flow diagram of a manner of capturing data according to an embodiment of the present invention.

One manner of capturing data at points of an ETL job without altering the job design or runtime flow pattern utilizes debugger server 108. Many ETL tools have debuggers which allow a user to debug a particular stage at record level once the problematic stage has been identified. A debugger client program (e.g., a component of tools module 104) can be implemented to accesses the job metadata, including the test case specification, and communicate with the debugger server. The client program operates to perform an automated debugging session in which data is captured at breakpoints corresponding to the specified capture points. A manner of capturing data via a client of the debugger server according to an embodiment of the present invention is illustrated in the flow diagram of FIG. 5. The debugger client retrieves a list of operators, nodes, links, and link directions from the job metadata at step 510, and reads the capture points and rules from the test case definition at step 520. At step 530, the debugger client sets debug points at the specified links for each node corresponding to the capture points. The job, debugger server, and debugger client run in parallel at step 540, and the debugger client captures the record data at each of the specified points. The debugger client writes captured record data to a file and tags the record data with the corresponding partition information at step 550. The debugger client compares the captured data against the baseline at step 560 and determines whether the captured data is consistent with the baseline. If not, at step 570, the debugger client identifies the stage or link where the first failure was observed.

In an alternative embodiment of the invention, the base operators are modified to include hooks for routines to capture data, where the behavior of the capture is controlled by configuration settings.

It will be appreciated that the embodiments described above and illustrated in the drawings represent only a few of the many ways of implementing embodiments for testing jobs in a computing environment.

The topology or environment of the present invention embodiments may include any number of computer or other processing systems, data storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for testing jobs in a computing environment of any type (e.g., ETL or other data integration, business intelligence, data modeling, local applications, network applications, etc.).

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computer-implemented method of testing jobs in a computing environment comprising:

creating a test case for one or more existing executable Extract, Transform, and Load (ETL) jobs comprising ETL job metadata by storing a definition of the test case as an element of the ETL job metadata without recompiling the ETL job and without introducing steps for debugging the ETL job, wherein the ETL job metadata comprises a specification of an ETL job design including operations performed by the ETL job, links between the operations and runtime parameters, wherein the test case includes one or more capture points in a job flow of the one or more executable jobs and corresponding rules for capturing data, identification of data for testing the one or more executable jobs, and rules for comparing the captured data to expected results, and wherein the capture points include at least one intermediate point of the job flow;

capturing the data at the one or more capture points in the job flow in accordance with the test case and generating a baseline of expected results; and executing the test case to test the one or more executable jobs by capturing data at the one or more capture points generated from execution of the one or more executable jobs and comparing result data from the one or more capture points to the baseline of expected results in accordance with the comparison rules to determine a result of the test.

2. The computer-implemented method of claim 1, wherein executing the test case includes:

comparing the result data to the baseline of expected results to identify a location of a first detected difference and indicate a first point of failure for the tested one or more executable jobs.

3. The computer-implemented method of claim 1, further comprising:

exporting the test case and corresponding one or more executable jobs to a new computing environment and executing the test case to test the one or more executable jobs in the new computing environment.

4. The computer-implemented method of claim 1, wherein the one or more executable jobs are tested utilizing regression testing.

5. The computer-implemented method of claim 1, wherein the one or more executable jobs remain unchanged for the testing.

6. The computer-implemented method of claim 1, wherein the test case further includes:

a name of the test case, a configuration file, the generated baseline, and operational metadata associated with generating the baseline;

capture and compare settings including the one or more capture points and the corresponding rules for capturing data, one or more comparison points in the job flow for comparison of data, and the rules for comparing the captured data;

the identification of data for testing the one or more executable jobs including a location of source data; and a generated sequence used to execute the test case, wherein the generated sequence comprises a job executable and a comparison operator.

7. The computer-implemented method of claim 1, wherein at least one of the one or more capture points is chosen by selecting a link in a diagram of the job flow.

8. The computer-implemented method of claim 1, wherein the data is captured by accessing the data at the one or more capture points via an automated debugger session.

9. The computer-implemented method of claim 1, wherein base operators of the one or more executable jobs capture the data at the one or more capture points according to the rules for capturing the data.

10. A system for testing jobs in a computing environment comprising:

at least one processor configured to:

create a test case for one or more existing executable Extract, Transform, and Load (ETL) jobs comprising ETL job metadata by storing a definition of the test case as an element of the ETL job metadata without recompiling the ETL job and without introducing steps for debugging the ETL job, wherein the ETL job metadata comprises a specification of an ETL job design including operations performed by the ETL job, links between the operations and runtime parameters, wherein the test case includes one or more capture points in a job flow of the one or more executable jobs and corresponding rules for capturing data, identification of data for testing the one or more executable jobs, and rules for comparing the captured data to expected results, and wherein the capture points include at least one intermediate point of the job flow;

capture the data at the one or more capture points in the job flow in accordance with the test case and generate a baseline of expected results; and execute the test case to test the one or more executable jobs by capturing data at the one or more capture points generated from execution of the one or more executable jobs and compare result data from the one or more capture points to the baseline of expected results in accordance with the comparison rules to determine a result of the test.

11. The system of claim 10, wherein executing the test case includes:

comparing the result data to the baseline of expected results to identify a location of a first detected difference and indicate a first point of failure for the tested one or more executable jobs.

12. The system of claim 10, wherein the processor is further configured to:

export the test case and corresponding one or more executable jobs to a new computing environment and execute the test case to test the one or more executable jobs in the new computing environment.

13. The system of claim 10, wherein the one or more executable jobs are tested utilizing regression testing.

14. The system of claim 10, wherein the one or more executable jobs remain unchanged for the testing.

15. The system of claim 10, wherein the test case further includes:

a name of the test case, a configuration file, the generated baseline, and operational metadata associated with generating the baseline;

capture and compare settings including the one or more capture points and the corresponding rules for capturing data, one or more comparison points in the job flow for comparison of data, and the rules for comparing the captured data;

the identification of data for testing the one or more executable jobs including a location of source data; and a generated sequence used to execute the test case, wherein the generated sequence comprises a job executable and a comparison operator.

16. A computer program product for testing jobs in a computing environment comprising:
- a non-transitory computer readable storage medium having computer readable program code embodied therewith for execution on a processing system, the computer readable program code comprising computer readable program code configured to:
  - create a test case for one or more existing executable Extract; Transform, and Load (ETL) jobs comprising ETL job metadata by storing a definition of the test case as an element of the ETL job metadata without recompiling the ETL job and without introducing steps for debugging the ETL job, wherein the ETL job metadata comprises a specification of an ETL job design including operations performed by the ETL job, links between the operations and runtime parameters, wherein the test case includes one or more capture points in a job flow of the one or more executable jobs and corresponding rules for capturing data, identification of data for testing the one or more executable jobs, and rules for comparing the captured data to expected results, wherein the capture points include at least one intermediate point of the job flow;
  - capture the data at the one or more capture points in the job flow in accordance with the test case and generate a baseline of expected results; and
  - execute the test case to test the one or more executable jobs by capturing data at the one or more capture points generated from execution of the one or more executable jobs and compare result data from the one or more capture points to the baseline of expected results in accordance with the comparison rules to determine a result of the test.

17. The computer program product of claim 16, wherein executing the test case includes:
- comparing the result data to the baseline of expected results to identify a location of a first detected difference and indicate a first point of failure for the tested one or more executable jobs.

18. The computer program product of claim 16, further comprising computer readable program code configured to:
- export the test case and corresponding one or more executable jobs to a new computing environment and execute the test case to test the one or more executable jobs in the new computing environment.

19. The computer program product of claim 16, wherein the one or more executable jobs remain unchanged for the testing.

20. The computer program product of claim 16, wherein the test case further includes:
- a name of the test case, a configuration file, the generated baseline, and operational metadata associated with generating the baseline;
- capture and compare settings including the one or more capture points and the corresponding rules for capturing data, one or more comparison points in the job flow for comparison of data, and the rules for comparing the captured data;
- the identification of data for testing the one or more executable jobs including a location of source data; and
- a generated sequence used to execute the test case, wherein the generated sequence comprises a job executable and a comparison operator.

* * * * *